United States Patent [19]
Péntek et al.

[11] Patent Number: 4,459,314
[45] Date of Patent: Jul. 10, 1984

[54] PROCESS FOR THE PREPARATION OF CHEMICALLY HOMOGENEOUS MINERAL FODDER ADDITIVES

[75] Inventors: István Péntek; József Kövecses, both of Budapest; Margit Surányi, Salgótarján; István Hutás, Budapest; István Temesvári, Budapest; Árpád Fazekas, Budapest, all of Hungary

[73] Assignee: Vasipari Kutató Intézet, Budapest, Hungary

[21] Appl. No.: 314,480

[22] Filed: Feb. 8, 1982

[51] Int. Cl.$^3$ .............................................. A23K 1/00
[52] U.S. Cl. ...................................... 426/74; 426/623; 426/630; 426/635; 426/648; 426/807
[58] Field of Search ................ 426/74, 648, 807, 623, 426/630, 635; 423/32, 33, 35, 49, 50, 140, 105, 144

[56] References Cited

U.S. PATENT DOCUMENTS

| | | | |
|---|---|---|---|
| 2,488,201 | 11/1949 | Kenny et al. | 423/42 |
| 2,698,220 | 12/1954 | Erskine | 423/35 |
| 2,912,305 | 11/1959 | Wagner | 423/35 X |
| 3,567,460 | 3/1971 | McCoy | 426/74 |
| 3,764,341 | 10/1973 | Carbonniere | 426/74 |
| 3,876,810 | 4/1975 | Carbonniere | 426/74 |
| 3,929,598 | 12/1975 | Stern et al. | 423/105 X |
| 4,029,820 | 6/1977 | Eisenberg | 426/74 |
| 4,042,722 | 8/1977 | Dunne et al. | 426/74 X |
| 4,093,698 | 6/1978 | Cardwell et al. | 423/50 X |
| 4,137,291 | 1/1979 | Cardwell et al. | 423/50 X |
| 4,214,996 | 7/1980 | Buddemeyer et al. | 426/74 |

Primary Examiner—R. B. Penland
Attorney, Agent, or Firm—Keil & Weinkauf

[57] ABSTRACT

The main advantage of the process is that as starting substances by-products and wastes of the metallurgical industry can be used (pickling solution, lean ores etc.). The thus-obtained salt mixtures are more homogeneous than the mixtures known so far.

7 Claims, No Drawings

PROCESS FOR THE PREPARATION OF CHEMICALLY HOMOGENEOUS MINERAL FODDER ADDITIVES

The invention relates to a new process for the preparation of chemically homogeneous mineral fodder additives. The main purpose of these fodder additives is to supply the fodder used in animal keeping with the necessary trace elements. According to the invention the fodder additives are prepared by the chemical processing of wastes, especially of wastes of the metallurgical industry.

The fodders and mixed fodders used in animal keeping do not comprise some biologically important minerals (trace elements) or do not contain the necessary quantity of them and therefore they must be supplemented by trace elements. The admixing and homogenization of the minerals used in small quantities is an important technological working process and the keeping of the reached homogeneity is not an easy task.

Up to now these mineral additive mixtures were generally prepared by mechanical admixing of salts of different chemical composition. Some micro elements (Mn, Cu, Zn, Co, Se, Mo, J, Fe, Ca, P, S, Mg, K, Na, Cl) can acceptably be admixed only by successive addition and in each case by homogenization following it in a rather laboursome way, the dispersion, however, is still rather high. Very often the danger of subsequent decomposition exits because the different metal salts differ in their specific weight and their particle structure. These problems occur not only with mineral mixtures used as fodder additive but also with trace element mixtures prepared for other fields of application (e.g. fertilizers).

The French patent specification No. 845,313 discloses a process according to which homogeneous salts are prepared from micro elements in one step with the addition of phosphoric acid and ground chalk. This process, however, has the disadvantage that one must start from relatively pure substances, e.g. the starting substances must not contain harmful heavy metals, such as As, Pb, and Sn. Furthermore it is disadvantageous that the not ruminating useful animals can utilize the metal phosphate only relatively badly.

It is the aim of the present invention to provide a process for the preparation of mineral fodder additives for animal feeding which are homogeneous in their total quantity and do not separate subsequently. Furthermore it is the aim of the invention to utilize byproducts and wastes of the metallurgical industry as well as inferior lean ores for the preparation of these fodder additives.

Consequently, the invention relates to a process for the preparation of chemically homogeneous mineral fodder additives. The process is characterized in that (a)

(1) zinc and/or copper are separated as (basic) carbonates from a zinc ammine complex and/or copper ammine complex solution preferably obtained by extraction of zinc and/or copper wastes with ammonia and carbon dioxide by the introduction of steam and/or by heat treatment and (2) the manganese is precipitated as manganese carbonate on the obtained carbonate (mixture) from a manganese sulfate solution containing 20–110 g./l., preferably 80–100 g./l. of manganese by the introduction of carbon dioxide and ammonia, or steps (1) and (2) are carried out in reversed sequence and optionally before or between the precipitations a carrier, preferably limestone, is added and then the solid phase is separated from the solution and, if desired, added to an aqueous solution containing 50–150 g./l., preferably 80–100 g./l. of iron(II) ions if desired, together with selenite and/or iodide, (b)

(3) from an aqueous solution containing iron(II) ions iron carbonate is precipitated by adding ammonium carbonate, optionally in the presence of a carrier, preferably limestone, on the obtained carbonate (mixture) zinc and/or copper carbonate and, resp., manganese carbonate are precipitated according to steps (1) and (2) or (2) and (1), hereupon the carbonates are optionally dissolved in the suspensions obtained according to variants (a) or (b) by adding sulphuric acid, optionally selenite and iodide are added to the obtained mixture and, resp., to the obtained solution, and the product is dried until it reaches a moisture content of less than 10%, preferably less than 1%.

As starting substances for the process of the invention by-products and wastes of the metallurgical industry as well as lean ores can be used as well. From zinc and copper wastes very pure ammine complex solutions can be obtained by extraction with carbon dioxide and water containing ammonia. The necessary manganese sulfate solution can be obtained by treatment with sulphuric acid of inferior manganese ores, and as solution containing iron(II) ions exhausted pickling solutions obtained during the pickling of iron plates are suitable.

The single components are precipitated homogeneously. If one works according to variant (a), the basic copper carbonate and/or the zinc carbonate are precipitated, depending on the sequence of steps (1) and (2), on the manganese carbonate or, if there is a carrier, on the carrier, too, or vice versa. As carrier first of all ground chalk is suitable but other mineral carriers are organic carriers like bran can be used as well. From the suspension obtained the solid phase is separated with suitable means (e.g. filter). The filter cake is then suspended to the solution containing iron(II) ions.

If one works according to variant (b), at first the carbonate of iron is precipitated optionally in the presence of a solid carrier. Thereupon steps (1) and (2) are carried out in any sequence, i.e. zinc and/or copper carbonate as well as manganese carbonate are precipitated on the carbonate of iron and, if there is a carrier, on the carrier, too.

The suspensions obtained according to variants (a) and (b) can optionally be admixed with selenite and iodide as further trace elements. As selenite suitably the aqueous solution of sodium selenite is used, and also the iodide is added in form of its soluble salts.

If the aim is the preparation of a homogeneous soluble salt mixture, no carriers are added and the carbonates formed in the course of the precipitation are dissolved with sulphuric acid. Here suitably the sulphuric acid content of the pickling solution containing iron(III) ions is utilized. In the course of the suspending in the pickling solution the carbonates generally dissolve, at most the pickling solution must be rendered stronger by the addition of some sulphuric acid. The thus-obtained solution is dried by spray-drying at maximum 250° C. In the obtained salt mixture the sulfates are present as monohydrates.

Even if the carbonates should not be dissolved after steps (1) and (2) a pickling solution can be used according to variant (a) as solution containing iron(II) ions but its sulphuric acid content must previously be neutralized in a corresponding way, suitably by the addition of iron turnings. The mixture containing the insoluble carbonates is dried not by spray-drying but preferably in a fluidization equipment. The carbonates can be filtered off before drying; if, however, soluble selenite and iodide compounds were added to the suspension than the whole slurry is dried.

The process of the invention has the following advantages:

(a) In contradiction of the mineral fodder additives known so far the product prepared according to the invention does not undergo separation and thus its composition remains constant.

(b) The process is suitable for the processing of wastes of the metallurgical and the chemical industry and the heavy metals harmful to living organisms (Pb, Sn, etc.) remain in the (not dissolved) barren. The formed enriched solutions can directly be used for the preparation of the product.

(c) The trace elements, like Zn, Cu, Mn, Fe etc., can be brought onto the indifferent carrier in form of carbonate or sulfate which promotes the absorption in the animal digestive tract.

(d) With the process of the invention the ratio of the trace elements can be adjusted at will and thus it can be adapted to any requirement.

The invention is further illustrated with the aid of the following Examples.

Example 1

Steam is introduced directly into 69.1. of a copper amine complex solution containing 110 g./l. of copper until basic copper carbonate $Cu(OH)_2CuCO_3$ corresponding to 3.4 kg. of copper precipitates. The filter cake is suspended in 687 l. of a zinc amine complex solution containing 120 g./l. of zinc. By introducing steam an amount of zinc carbonate corresponding to 41 kg. of zinc is separated. The carbonate mixture is filtered off. The filter cake is suspended in 512.5 l. of a manganese sulfate solution containing 80 g./l. manganese. Under stirring ammonia and carbon dioxide are introduced the suspension until manganese carbonate corresponding to 41 kg. of manganese is separated. The carbonate mixture is separated from the solution by filtration and suspended in 142 l. of an iron sulfate solution containing 100 g./l. of iron(II). (This solution was obtained from a pickling solution by neutralizing the sulphuric acid content with iron-turnings.) The thus-obtained suspension is dried in a fluidization equipment at 100° C. up to a moisture content of 1%. 248 kg. of the salt mixture a carrier-free salt mixture containing the elements Mn, Zn, Fe and Cu in a ratio of 1:1:0,344:0,0835 and altogether 40.2% of trace elements is obtained which can be used preferably for poultry fodder.

Example 2

Zinc and copper carbonate are separated as described in Example 1. The separated carbonate mixture is suspended together with 750 kg. of calcium carbonate in 1025 l. of a manganese sulfate solution containing 40 g./l. of manganese. Under stirring ammonia and carbon dioxide are introduced into the suspension until manganese carbonate corresponding to 41 kg. of manganese is separated. The carbonate mixture is filtered off and suspended in 142 l. of an iron sulfate solution containing 100 g./l. of iron(II). The obtained suspension is dried in a fluidization equipment at 100° C. up to a moisture content of 1%. 998 kg. of a salt mixture containing limestone as carrier and the elements Mn, Zn, Fe and Cu in a ratio of 1:1:0,344:0,0835 and altogether 10% of trace elements are obtained which is mainly suitable for poultry fodder.

Example 3

Steam is directly introduced into 378 l. of a copper ammine complex solution containing 110 g./l. of copper until a quantity of basic copper carbonate corresponding to 18.9 kg. of copper is precipitated. It is filtered off. The filter cake is suspended in 955 l. of a zinc ammine, complex solution containing 120 g./l. of zinc. Steam is directly introduced into the solution until an amount of zinc carbonate corresponding to 57.3 kg. of zinc is precipitated. The carbonate mixture is filtered off and the filter cake is suspended in 300 l. of a manganese sulfate solution containing 80 g./l. of manganese. Under stirring ammonia and carbon dioxide are introduced into the suspension until a quantity of manganese carbonate corresponding to 24 kg. of manganese is precipitated. The carbonate mixture is filtered off and dried in a fluidization equipment at 100° C. up to a moisture content of 1%. 193 kg. of a carrier-free salt mixture containing the elements Mn, Zn and Cu in a ratio of 1:2,413:0,796 and altogether 52.1% of trace elements are obtained which is mainly suitable for pig fodder.

Example 4

Zinc and copper carbonate are precipitated and filtered off as described in Example 1. The filter cake is suspended together with 808 kg. of ground chalk in 1188 l. of a manganese sulfate solution containing 20 g./l. of manganese. Under stirring ammonia and carbon dioxide are introduced into the suspension until a quantity of manganese carbonate corresponding to 23.7 kg. of manganese is separated. The carbonate mixture is filtered off and the filter cake is dried in a fluidization equipment at 100° C. up to a moisture content of 1%. 1005 kg. of a salt mixture containing the elements Mn, Zn and Cu in a ratio of 1:2,413:0,796 and calcium carbonate as carrier are obtained which is mainly suitable for pig fodder and contains altogether 10% of trace elements.

Example 5

Steam is directly introduced into 12 l. of a copper ammine complex solution containing 110 g./l. of copper until a quantity of basic copper carbonate corresponding to 600 g. of copper is precipitated. It is filtered off and suspended in 500 l. of a zinc ammine complex solution containing 120 g./l. of zinc. Under stirring steam is directly introduced into the suspension until an amount of zinc carbonate corresponding to 30 kg. of zinc is separated. The carbonate mixture is filtered off and suspended in 750 l. of a manganese sulfate solution containing 80 g./l. of manganese. Under stirring ammonia and carbon dioxide are introduced into the suspension until a quantity of manganese carbonate corresponding to 60 kg. of manganese is separated. The carbonate mixture is filtered off. The filter cake is suspended in 96 l. of an iron sulfate solution containing 100 g./l. of iron-(II). The obtained suspension is dried in a fluidization equipment at 100° C. up to a moisture content of 1%. 245 kg. of a salt mixture containing the elements Mn, Zn, Fe and Cu in a ratio of 1:0,5:0,16:0,01 and altogether 40.8% of trace elements are obtained which is mainly suitable for cattle fodder.

Example 6

Copper and zinc carbonate are separated and filtered off as described in Example 5. The filter cake is suspended together with 750 kg. of bran in 1500 l. of a manganese sulfate solution containing 40 g./l. of manganese. Into the suspension ammonia and carbon dioxide are introduced until an amount of manganese carbonate corresponding to 60 kg. of manganese is separated. The solid phase consisting of bran and the carbonates is filtered off and suspended in 96 l. of an iron sulfate solution containing 100 g./l. of iron(II). The thus-obtained suspension is dried in a fluidization equipment at 100° C. up to a moisture content of 1%, 995 kg. of a salt mixture containing the elements Mn, Zn, Fe and Cu in a ratio of 1:0,5:0,16:0,01 and bran as carrier and altogether 10% of trace elements are obtained which is especially suitable for cattle fodder.

Example 7

One proceeds according to the method described in Example 1 but the filtered carbonate mixture is not suspended in a neutralized pickling solution but in a sulphuric acid pickling solution to which 82 l. of concentrated sulphuric acid were added. The carbonates dissolve. The thus-obtained solution is dried in a spray-dryer at 250° C. The moisture content of the product lies under 1%. 295 kg. of a sulfate mixture containing the elements Mn, Zn, Fe and Cu in a ratio of 1:1:0,344:0,0855 are obtained which is especially suitable for poultry fodder (trace element content: 34%).

Example 8

6.5 kg. of calcium carbonate of a particle size of 100–500 micrometers are suspended in 10 l. of a manganese sulphate solution containing 40 g./l. of manganese. Ammonia and carbon dioxide are introduced into the suspension until an amount of manganese carbonate corresponding to 400 g. of manganese is separated on the carrier. 350 ml. of a copper ammine complex solution (100 g. of copper per liter) and 380 ml. of a zinc ammine complex solution (110 g. of zinc per liter) are added to the suspension. Steam is directly introduced into the mixture at 85°–90° C. until an amount of copper carbonate corresponding to 16 g. of copper and an amount of zinc corresponding to 200 g. of zinc are separated. The carbonate mixture is filtered off and intensively admixed with one liter of an aqueous solution containing 102.4 g. of iron(II), an amount of sodium selenite corresponding to 0.456 g. of elementary selenium and an amount of ethylenediamine-dihydroiodide corresponding to 9.24 g. of elementary iodide. The suspension is dried at 80° C. in a fluidization equipment up to a moisture content of 1%.

Example 9

6.5 kg. of calcium carbonate of a particle size of 100–500 micrometers are suspended in 3 l. of a filtered pickling solution containing 50 g./l. of iron(II). The pH-value of the suspension is adjusted to 3 with tartaric acid and then the iron is precipitated as iron carbonate on the carrier by adding ammonium carbonate. 10 l. of a manganese sulphate solution containing 40 g./l. of manganese are added to the obtained suspension. Under stirring ammonia and carbon dioxide are added to the thus-obtained suspension until an amount of manganese carbonate corresponding to 400 g. of manganese is separated. Zinc and copper carbonate are precipitated in the suspension onto the particles in the way as described in Example 8. Sodium selenite and ethylenediamine-dihydroiodide are added to the thus-obtained carbonate suspension in an amount corresponding to 0.456 g. of elementary selenium and 9.24 g. of iodide, respectively. The solution is dried at 80° C. in a fluidization equipment up to a moisture content of 1%.

We claim:

1. A process for the preparation of homogeneous mineral fodder additives containing minerals selected from the group consisting of zinc, copper, manganese, iron, calcium, selenium, iodine, or mixtures thereof, which consists essentially of:
   (a) precipitating and separating zinc carbonate from a solution of zinc ammine complex by introducing steam into the solution, by heating the solution, or both, which solution is prepared by extraction of zinc from zinc waste with ammonia and carbon dioxide; and separating the zinc carbonate from the resulting suspension;
   (b) suspending the zinc carbonate in a solution of copper amine, which solution is prepared by extraction of copper from copper wastes with ammonia and carbon dioxide; precipitating copper carbonate from the resulting suspension by introducing steam, heating or both, and separating the resulting carbonate mixture from the suspension;
   (c) suspending the carbonate mixture in a manganese sulfate solution obtained from decomposing manganese ores with sulfuric acid, which solution contains 20–100 g/l manganese; precipitating manganese carbonate from the resulting suspension by introducing carbon dioxide and ammonia, and separating the resulting carbonate mixture from the suspension;
   (d) suspending the carbonate mixture in an aqueous solution of ionizable compounds selected from the group consisting of iron sulfate containing iron II, sodium selenite, ethylenediamine dihydroiodide, or a mixture thereof;
   (e) optionally, adding a solid carrier to the suspension described in paragraph (d) or to any of the solutions or suspensions described in paragraphs (a), (b), or (c); and
   (f) drying the resulting suspension until it reaches a moisture content of less than 10%, preferably less than 1%.

2. A process as described in claim 1, except that those steps described in paragraph (a) and those described in paragrah (b) are reversed in the sequence of their performance.

3. A process for the preparation of homogeneous mineral fodder additives containing minerals selected from the group consisting of zinc, copper, manganese, iron, calcium, selenium, iodine, or mixtures thereof, which consists essentially of:
   (a) precipitating manganese carbonate from a manganese sulfate solution obtained from decomposing manganese ores with sulphuric acid by introducing ammonia and carbon dioxide;
   (b) adding a solution of zinc amine complex to the resulting suspension, which solution is prepared by extraction of zinc from zinc waste with ammonia and carbon dioxide;
   (c) adding a solution of copper amine complex to the resulting suspension, which solution is prepared by extraction of copper from copper waste with ammonia and carbon dioxide;

(d) precipitating zinc carbonate, copper carbonate, or both from the resulting suspension by introducing steam, heating or both, and separating the carbonate mixture from the suspension;

(e) suspending the carbonate mixture in an aqueous solution of ionizable compounds selected from the group consisting of iron sulfate, containing iron II, sodium selenite, ethylenediamine dihydroiodide, or a mixture thereof;

(f) optionally, adding a solid carrier to the suspension described in paragraph (e), or to any of the solutions or suspensions described in paragraphs (a), (b), or (c); and (g) drying the resulting suspension until it reaches a moisture content of less than 10%, preferably less than 1%.

4. A process for the preparation of homogeneous mineral fodder additives containing minerals selected from the group consisting of zinc, copper, manganese, iron, calcium, selenium, iodine, or mixtures thereof, which consists essentially of:

(a) precipitating iron carbonate from an aqueous solution of Fe(II) ions by adding ammonium carbonate;

(b) adding manganese sulfate solution obtained from decomposing manganese ores with sulfuric acid to the resulting suspension, and precipitating manganese carbonate by adding ammonia and carbon dioxide;

(c) adding a solution of zinc complex to the resulting suspension, which solution is prepared by extracting zinc from zinc waste with ammonia and carbon dioxide;

(d) adding a solution of copper amine complex to the resulting suspension, which solution is prepared by extracting copper from copper waste with ammonia and carbon dioxide;

(e) adding a solid carrier to the solution described in paragraph (a), or to any of the suspensions described in paragraphs (b), (c), or (d);

(f) precipitating zinc carbonate, copper carbonate, or both from the suspension by introducing steam, heat or both;

(g) adding soluble and ionizable selenium salts, iodine salts, or both to the resulting suspension; and (h) drying the resulting suspension until it reaches a moisture content of less than 10%, preferably less than 1%.

5. A process as described in claim 4 except that those steps described in paragraph (b) follow those described in paragraph (f).

6. Processes as described in claims 1–5 wherein either sulfuric acid is added to the suspension existing after all metals have been precipitated as carbonates, or the carbonate mixtures obtained therefrom are dissolved in a sulfuric acid solution.

7. Processes as claimed in claims 1–5 wherein sulfuric acid or a neutralized pickling solution is used as an aqueous solution containing Fe(II) ions.

* * * * *